March 19, 1968  T. P. SMITH  3,374,076

METHOD FOR PRODUCING HERMETIC GLASS TO METAL SEALS

Filed Sept. 28, 1964

INVENTOR
TERRY P. SMITH

BY *Sughrue, Rothwell, Mion, Zinn & Macpeak*

ATTORNEYS

United States Patent Office 3,374,076
Patented Mar. 19, 1968

3,374,076
METHOD FOR PRODUCING HERMETIC GLASS TO METAL SEALS
Terry P. Smith, Raleigh, N.C., assignor to Corning Glass Works, Corning, N.Y., a corporation of New York
Filed Sept. 28, 1964, Ser. No. 399,563
7 Claims. (Cl. 65—18)

This invention relates to the production of hermetic glass to metal seals. The invention is further concerned with the formation of hermetic glass to metal seals in articles which must conform exactly to dimensional requirements.

There are many known methods for producing glass to metal hermetic seals. When the sole object is producing a hermetic seal, this may easily be accomplished by heating the glass, which may be a single unit or a powder, in contact with the metal to a temperature greatly in excess of the softening point of the glass. Although excellent hermetic seals may be produced by this simple technique, the glass in the final product is apt to be in the form of a shapeless glob. For many applications, however, it is necessary to produce a product which has a hermetic glass to metal seals and which also conforms to exacting dimensional configuration requirements.

An example of this type of product is a casing for miniaturized electrical components, such as integrated circuits. It is well known that integrated circuits may contain as many as 60 electrical components in an area less than one square centimeter. The casings used to house such integrated circuits must satisfy configuration requirements almost as exacting as those applied to the circuits themselves.

Another factor that must be considered in producing hermetic glass to metal seals is the shrinkage of the glass after it is heated to a temperature sufficiently high to produce hermeticity. Again, this shrinkage may present difficult problems when the final product must conform to rigid configuration requirements.

A further difficulty is presented by the now common usage of metallic grids instead of individual wires as the electrical leads in many components containing hermetic seals. A grid is a plurality of electrical leads joined by a metal strip at their posterior end. The relatively rigid nature of the grid restrains the shrinkage of the glass with a resultant distoriton of the final product when conventional methods of sealing glass to metal are employed. A typical glass used to produce seals with Kovar metal, such as the glass described in United States Patent No. 2,392,-314, shrinks as much as 13% upon being heated to a suitable sealing temperature. As yet, the art has presented no method suitable for sealing these glasses to metal grids to produce an article having a predetermined and exact configuration.

Accordingly, it is an object of this invention to provide a method for producing hermetic glass to metal seals which overcomes the foregoing problems and enables seals to be formed which conform to exacting requirements, both as to dimension and configuration.

In general, according to the present invention, these and other objects of this invention are accomplished by grinding a glass, having substantially the same thermal expansion characteristics as the metal to which it will be sealed, to an ultrafine particle size, mixing the ultrafine glass with a binder to form larger particles, pressing the glass and the metal to form a compact having the configuration desired in the final product, and heating the compact to a temperature in excess of the softening point of the glass for a time sufficient to form a hermetic seal.

The invention will be more fully understood in the light of the following detailed description and specific examples of preferred embodiments of the invention viewed with reference to the accompanying drawings.

Figure 1:
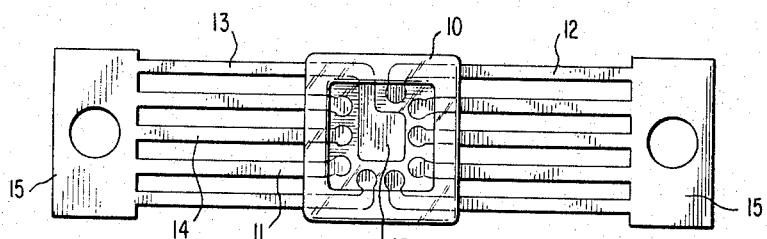
FIGURE 1 is a casing for housing miniaturized electrical components which is produced by the method of this invention.

The glass which is used in the method of this invention is chosen primarily for its thermal expansion characteristics and its ability to adhere to the metal used. The glass must have substantially the same coefficient of expansion as the metal. For example, when Kovar metal, having a coefficient of linear expansion of $45 \times 10^{-7}$, is used, a particularly suitable glass for bonding to it is that described in United States Patent No. 2,392,314. These are glass compositions containing silica, boric oxide, alumina and alkali metal oxides, the $SiO_2$ being 60–75%, $B_2O_3$ 10–20%, $Al_2O_3$ 5–10% and the alkali metal oxides comprising not over 5% $K_2O$ and not over 2% $Li_2O$ with or without, but not exceeding, 3% $Na_2O$. These glasses may also contain BaO or $CaF_2$ and other ingredients in amounts not exceeding 10–15% of the total composition. An exemplary glass has the following composition: about 65.5% $SiO_2$, about 15.3% $B_2O_3$, about 9.0% $Al_2O_3$, about 3.0% BaO, about 2.1% $Na_2O$, about 3.1% $K_2O$, about 1.1% $Li_2O$ and about 1.0% KCl. The coefficient of linear expansion of this glass is $46 \times 10^{-7}$. When it is desired to produce a colored product, a small amount of a suitable dye may be added to the glass. About 1% by weight is usually sufficient to produce the desired color.

Any metal conventionally used for forming hermetic seals with glass may be employed. Kovar is the preferred metal. The metal may be in the form of grids, wires, or even sheets. As previously discussed, a hermetic seal between a metallic grid and glass in a product conforming to rigid configuration requirements has not been possible by the methods of the prior art. This is attributable to the fact that the relatively rigid grid inhibits the shrinkage of the glass upon heating and thereby distorts the final article. Thus, in a preferred embodiment, this invention provides a method for hermetically sealing a glass to a metallic grid to produce an article of specific configuration.

An essential feature of this invention is the grinding of the glass to an ultrafine state. In prior art, methods of sealing a powdered glass to a metal, the glass was ground to a state permitting a large proportion of it to pass through a 200 or 250 mesh screen. It has now been found, quite unexpectedly, that by grinding the glass to a state far finer than that used in the prior art, the failures of the prior art may be overcome. Preferably, the glass is ground to a state permitting at least about 90% of it to pass through a 325 mesh screen and about 99% of it to pass through a 200 mesh screen. In a particularly preferred embodiment, 96% of the glass is less than 325 mesh, 98.9% less than 300 mesh, and 100% less than 200 mesh. As used in this specification and the appended claims, the term ultrafine refers to glass of a particle size and not larger than the following:

(a) 100% finer than 300 mesh, or
(b) 100% finer than 275 mesh and 20% finer than 325 mesh.

These ranges represent the upper limit of coarseness of the particle size of the glass which is operable in this method. The preferred embodiments of the method are well within these upper limits.

Although I do not wish to be limited to any particular explanation of why the use of ultrafine glass produces both excellent hermeticity and configuration while the use of coarser particles, as taught by the prior art, results in imperfect seals, a possible explanation is that by using smaller particles more particles may be compacted into a given volume. The presence of a greater number of discrete particles in the compact then results in a stricter adherence to configuratin when the glass is heated above its softening point.

After being ground to an ultrafine state, the glass is mixed with a suitable binder to form larger particles which can be easily compressed to form a compact. The mixing of the glass with the binder, although an essential step of the method of this invention, itself forms no part of the invention and may be performed in a wide variety of suitable ways. A particularly preferred technique for this step is that disclosed in United States Patent No. 2,390,354. This comprises mixing the finely ground glass with an organic binder which may be carbowax, sugar, starch, dextrin, gelatin, glycerine, ethylene glycol, cellulose nitrate, cellulose acetate, amyl and butyl alcohols, paraffin, polyethylene glycol, mineral oils, biphenyl, and a wide variety of similar binders. Any material capable of cohering the glass into granules and which may be burned out at at temperature less than the softening point of the glass may be used as the binder. The amount of binder is not critical as it is removed prior to the firing step. Usually, about 0.5% to 6% by weight of binder is suitable.

After the binder is mixed with the ultrafinely ground glass, the resulting aggregates of ultrafine particles are then screened to remove particles larger than 35 mesh and smaller than a 150 mesh. The size of the aggregates removed can vary within wide limits depending upon the articles which is to be produced from the glass. For instance, for some applications it is desirable to remove all particles larger than 65 mesh.

The aggregates formed by the addition of the binder to the glass are then compressed in a suitable mold to form a compact. The pressure used in forming the compact is not critical since the binder serves to maintain the configuration of the compact prior to firing. Pressures in the range of from 1500 p.s.i. to 3500 p.s.i. are suitable. The compact should have approximately the configuration desired for the final product, since it does not deform during the heating stages. The compression used to form the compact breaks down the larger particles formed with the binder and thus most of the particles which are in the compact are in the ultrafine particle size range. However, after the binder has been burned out, all of the particles are of ultrafine size.

Following this, the compact is transferred to an oven where it is heated. This may be conducted either as a batch process or in a continuous kiln. The heating may be conducted in any atmosphere, but an inert atmosphere, such as nitrogen, is preferred. When the process is conducted on a batch basis, the compact is first heated to a temperature of from about 350° C. to about 650° C. and held at this temperature for about from 20 to 30 minutes. The purpose of this initial heating is to burn out the binder. Following this, the compact is heated to a temperature in excess of the softening point of the glass thereby to produce the hermetic seal. This temperature, which will vary with the particular glass being used, must be high enough to achieve hermeticity but not high enough to destroy the configuration of the compact. When those glasses described in United States Patent No. 2,392,314 are used, temperatures in the range of from 760° C. to 840° C. are suitable. In a preferred embodiment, with this same glass, it is heated to a temperature of from 780° C. to 810° C. and held at this temperature for a period of time sufficient to achieve hermeticity. The length of time for which heating is conducted is not critical. At 780° C., a hermetic seal will be produced after heating for about 20 minutes, while with temperatures as high as 810° C., it is only necesary to heat the compact for from about 9 to 12 minutes. Following the firing step, the hot article is placed in a furnace and annealed. This can be done by cooling it from 500° C., down through 400° C. at a rate not exceeding 10° per minute temperature decrease.

In a preferred commercial embodiment, the binder burn-out, firing step, and annealing step will be carried out in a continuous kiln. As the compact is conveyed through the kiln, its temperature is gradually increased to in excess of 350° C. and held there for about 20 minutes. Following this the compact is fired by bringing it to a temperature in excess of the softening point of the glass. The same temperature ranges and times used in the batch process are applicable here. In the latter stages of the kiln, the compact is then annealed as was done in the batch process.

The following detailed examples will serve to illustrate certain preferred embodiments of this invention.

Example 1

The method of this invention is used to produce hermetic seals in articles where precise configuration is a primary requirement. An example of such an article appears in FIGURE 1, which shows a fired glass receptacle 10 which is hermetically sealed to a Kovar metal grid 11. The grid is divided into sections 12 and 13 and includes lead wires 14 hermetically sealed to glass receptacle 10. The lead wires 14 are confined at their posterior ends by tabs 15. At the anterior end of grid section 11 is tab 16 which is located in the center of glass receptacle 10. This receptacle which is specifically adapted to house minaturized electrical components, such as integrated circuits, can be prepared as follows.

Glass cullet having the composition (in weight percent) 65.5% $SiO_2$, 15.3% $B_2O_3$, 9.0% $Al_2O_3$, 3.0% $BaO$, 2.1% $Na_2O$, 3.1% $K_2O$, 1.1% $Li_2O$, and 1.0% $KCl$ is crushed and all particles larger than one-quarter inch discarded. 115 pounds of this glass is mixed with 35 cc. of ammonium hydroxide and then ball milled for 36 hours. The ground glass is then screened to produce a batch having 100% finer than 200 mesh, 98.9% finer than 300 mesh, and 96% finer than 325 mesh. To this ultrafinely ground glass there is added 6.9 pounds of Carbowax (polyethylene glycol) binder (6% by weight of 115 lbs.) and 1.15 pounds of Pemco Black dye (1% by weight of 115 pounds). The product is then spray-dried and screened to remove all aggregates which are larger than 65 mesh and smaller than 150 mesh.

Kovar grids are pretreated by a standard technique to ready them for use. This comprises annealing and outgasing the grids by heating them for three minutes in a dry hydrogen atmosphere at a temperature of approximately 1930° F. Following this, a controlled oxide film is formed on the surface of the Kovar grid by heating for five minutes in wet hydrogen atmosphere at a temperature ot approximately 1470° F. The grids are then cleaned ultrasonically and rinsed with acetone and methyl alcohol. A compact is then formed by inserting the glass powder in a cavity into which the Kovar grids have been placed and dry pressing to form the compact. Dry pressing destroys the particle structure which has been formed by the addition of the binder, and thus, most of the glass in the compact is in an ultrafine state.

The compact is then placed in a continuous conveyor kiln where it is subjected to three heat treatments. These comprise binder burn-out, firing, and annealing. During the first stage of the heat treatment, the compact is gradually heated to a temperature of about 350° C. and held at this temperature for approximately 20 minutes. In the next stage, the temperature of the compact is raised through the softening point of the glass, which is 712° C., to the maximum temperature of 800° C. and then the temperature is decreased again to 712° C. The total time span above 712° C. is about 10 minutes. The compact is rapidly cooled to 500° C. and then gradually cooled from 500° C. to 400° C. at the rate of about 10° decrease per minute to anneal the article. Following this, the bottom and top surface of the article are ground and cleaned ultrasonically. The Kovar grids are then gold-plated using a Fidelity Corporations gold-plating process.

The final product has the glass hermetically sealed to the Kovar grid and has precisely the same configuration as did the compact. It can be used as a casing for integrated circuitry.

*Example 2*

Rather than use a continuous kiln, the method of this invention may also be employed using a batch process.

The glass is prepared in a manner identical to that set forth in Example 1, except that it is ball milled for 36 hours and the Pemco Black dye is omitted. The ground glass is 99% finer than 200 mesh and 90% finer than 325 mesh. A Carbowax binder is added as in Example 1 and a compact formed by dry pressing the glass powder into a cavity in which a Kovar grid has been inserted. The compact is then transferred to a conveyor kiln where it is heated at a temperature of 390° C. for 24 minutes to burn out the binder. Following this, the hot compact is heated in a batch furnace, under a nitrogen atmosphere, at a temperature of 780° C. for 20 minutes. The compact at a temperature still above 500° C. is then transferred to a second batch furnace where it is cooled from 500° C. down to 400° C. at a temperature decrease less than 10° per minute to thereby anneal the glass.

The article is then ground and cleaned ultrasonically. The final product exhibits both excellent hermeticity and precise configuration.

By way of comparison, when glass having a particle size of 200 mesh is used in the method described in Example 1, the glass in the final product is in the form of a shapeless glob. It has been determined that glass of 200 mesh cannot maintain its configuration, if heated under conditions more severe than 400° C. for 10 minutes. Mild heating of this order does not result in hermeticity and thus, conventionally prepared glasses cannot be used when it is necessary to achieve both configuration and hermeticity.

Figure 2:
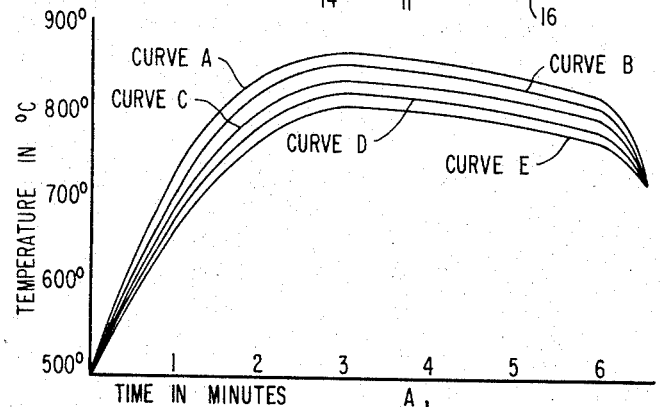
FIGURE 2 is a graph of firing cycles which can be used to produce hermetic seals.

It is interesting to compare the properties of articles manufactured from glasses within and without the scope of this invention. Two samples of the glass used in Example 1 are ground. Sample 1 is ground to 90% finer than 325 mesh and 99% finer than 200 mesh while Sample 2 is only 85% finer than 200 mesh and 78% finer than 325 mesh, which is too coarse to be included within the scope of this invention. Articles are prepared from these samples by following the procedure set forth in Example 1. However, the firing cycles are changed from that of Example 1 with the firing cycles used being these set forth in FIGURE 2. FIGURE 2 is a graph of temperature plotted against time in minutes. After firing in the manner shown by the five curves, the articles are then finished by following the remainder of the procedure of Example 1. Fifty articles of glass, Samples 1 and 2, respectively, are fired at each cycle.

Figure 3:
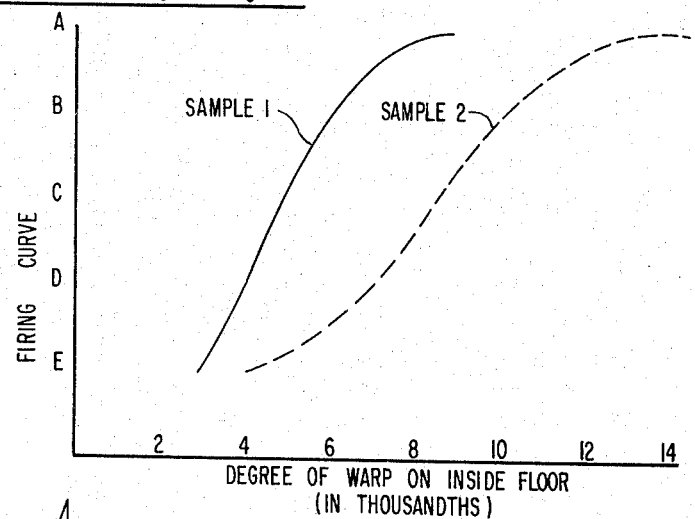
FIGURE 3 is a graph of configuration plotted against firing cycle.

FIGURE 3 gives a comparison of how these articles maintained their configuration upon heating. Each point on the graph represents the average degree of warp on the inside floor of each part produced by the firing curves. Degree of warp, which is indicative of configuration, was measured with a Tumico Tubular Micrometer. Note that at each firing cycle the articles of Sample 1 maintained their configuration substantially better than did the articles produced from Sample 2. In this regard, it must be remembered that even Sample 2 is formed from glass prepared according to the present invention and having a particle size considerably finer than is used in the prior art.

Figure 4:
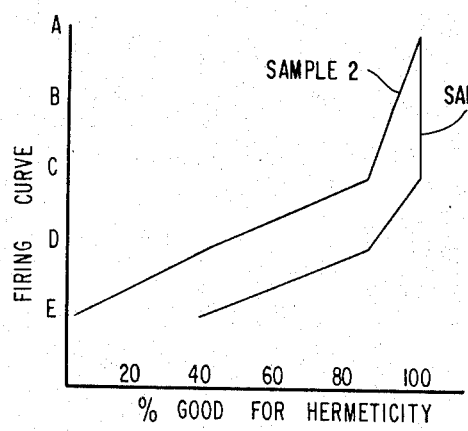
FIGURE 4 is a graph of hermeticity plotted against firing curve.

FIGURE 4 sets forth a plot of the hermeticity of the articles produced. Thirty parts produced from each sample of glass were tested for hermeticity using a Veeco MS9 Leak Detector. The graph sets forth the percentage of the 30 articles formed by each firing curve which are hermetic. By hermetic is meant that the part had a leak rate of less than $1 \times 10^{-8}$ standard ccs. of helium per second. Parts exhibiting a leak rate in excess of this must be considered defective. As shown by the graph, the parts produced from Sample 1 were more hermetic than those produced from Sample 2. This is true at every firing cycle except for cycle A where the parts produced from both samples were 100% hermetic. However, cycle A uses a temperature of 875° C. which always yields hermeticity, but as shown in FIGURE 3, the configuration of these parts is so poor they are not usable.

The method of this invention may be used to produce hermetic glass to metal seals in a wide variety of articles in which exact configuration is required. Thus, for example, this method may be used to produce precision casings for integrated circuits.

Although the present invention has been described with reference to certain preferred embodiments, it will be understood that various changes and modifications may be made in the procedures and products without departing from the scope of the invention as defined in the following claims.

I claim:

1. A method for producing a hermetic glass to metal seal which meets exacting requirements of dimension and configuration consisting essentially of the steps of: grinding a glass to an ultrafine particle size such that about 99% will pass through a 200 mesh screen and at least 90% through a 325 mesh screen, said glass having substantially the same thermal expansion characteristics as the metal to which it will be sealed, mixing the ultrafine glass with a binder to form large aggregates, pressing the aggregates and the metal to form a compact of the desired shape and heating said compact to a temperature in excess of the softening point of the glass for a time sufficient to form a hermetic seal.

2. The method of claim 1 wherein said glass is ground to a particles size such that about 100% will pass through a 200 mesh screen, about 98.9% through a 300 mesh screen and about 96% through a 325 mesh screen.

3. A method of producing a hermetic glass to Kovar metal seal of predetermined dimensions and configuration consisting essentially of the steps of: grinding a glass to an ultrafine state such that about 99% will pass through a 200 mesh screen and at least 90% through a 325 mesh screen, said glass having substantially the same thermal expansion characteristics as Kovar metal, mixing the ultrafine glass with a binder to form larger aggregates, pressing said aggregates about a Kovar grid to form a compact of the desired dimensions and configuration, and heating said compact to a temperature in excess of the softening point of the glass for a time sufficient to form a hermetic seal.

4. The method of claim 3 wherein said glass is ground to a particle size such that about 100% will pass through a 200 mesh screen, about 98.9% through a 300 mesh screen and about 96% through a 325 mesh screen.

5. The method of claim 3 wherein said glass has the following composition: 60–75% $SiO_2$, 10–20% $B_2O_3$, 5–10% $Al_2O_3$, not more than 5% $K_2O$, not more than 2% $Li_2O$, not more than 3% $Na_2O$, and not more than 10–15% other ingredients and said compact heated to a temperature of between 760° and 840° C. for a time sufficient to form an hermetic seal between said glass and said Kovar grid.

6. A method for producing a casing for miniaturized electrical components consisting essentially of the steps of: grinding a glass to a size such that at least about 90% will pass through a 325 mesh screen and about 99% through a 200 mesh screen, said glass being comprised of about 65.5% $SiO_2$, about 15.3% $B_2O_3$, about 9.0% $Al_2O_3$, about 3.0% $BaO$, about 2.1% $Na_2O$, about 3.1% $K_2O$, about 1.1% $Li_2O$, and about 1.0 KCl, mixing the ultrafine glass with a binder to form larger particles, pressing said particles about a Kovar grid to form a compact having substantially the same configuration as the casing, and heating said compact to a temperature of between 780° and 810° C. for a time sufficient to form a hermetic seal between said glass and said Kovar grid and thereby to produce a casing conforming exactly to the desired configuration of the casing.

7. A method for producing a casing for miniaturized electrical components consisting essentially of the steps of: grinding a glass to a particle size such that about 100% of it will pass through a 200 mesh screen, about 98.9% through a 300 mesh screen, and about 96% through a 325 mesh screen, said glass having the following composition: 65.5% $SiO_2$, about 15.3% $B_2O_3$, about 9.0% $Al_2O_3$, about 3.0% BaO, about 2.1% $Na_2O$, about 3.1% $K_2O$, about 1.1% $Li_2O$, and about 1.0% KCl, mixing the glass with a binder to form larger particles, pressing said particles about a Kovar grid to form a compact having substantially the same configuration as the casing, and heating said compact to a temperature of between 780° and 810° C. for a time sufficient to form a hermetic seal between said glass and said Kovar grid and to thereby produce a casing conforming to exacting configuration requirements.

References Cited

UNITED STATES PATENTS

| | | | |
|---|---|---|---|
| 2,265,352 | 12/1941 | Grobin et al. | 65—23 X |
| 2,390,354 | 12/1945 | Clapp | 65—17 X |
| 3,088,835 | 5/1963 | Piroz. | |
| 3,212,921 | 10/1965 | Pliskin et al. | |
| 2,053,244 | 9/1936 | Turk | 161—196 |
| 2,392,314 | 1/1946 | Dalton | 161—196 |
| 3,006,984 | 10/1961 | Bol et al. | |

S. LEON BASHORE, *Acting Primary Examiner.*

DONALL H. SYLVESTER, *Examiner.*

R. L. LINDSAY, *Assistant Examiner.*